(12) United States Patent
Takahashi

(10) Patent No.: US 6,272,459 B1
(45) Date of Patent: *Aug. 7, 2001

(54) VOICE SIGNAL CODING APPARATUS

(75) Inventor: Hidetaka Takahashi, Musashino (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/845,543

(22) Filed: Apr. 11, 1997

(30) Foreign Application Priority Data

| Apr. 12, 1996 | (JP) | 8-091177 |
| Apr. 12, 1996 | (JP) | 8-091178 |
| Apr. 15, 1996 | (JP) | 8-092768 |

(51) Int. Cl.[7] .................... G10L 19/04

(52) U.S. Cl. .............. 704/221; 704/219; 704/220

(58) Field of Search ................. 704/213, 214, 704/225, 226, 228

(56) References Cited

U.S. PATENT DOCUMENTS

| 4,630,305 | * | 12/1986 | Borth et al. ............... 381/94 |
| 4,959,865 | * | 9/1990 | Stettiner et al. ............ 381/46 |
| 5,012,519 | * | 4/1991 | Adlerberg et al. .......... 381/47 |

(List continued on next page.)

FOREIGN PATENT DOCUMENTS

| 43 15313A1 | 11/1994 | (DE) . |
| 43 15315 A1 | 11/1994 | (DE) . |
| 654 909 A1 | 12/1994 | (EP) . |

OTHER PUBLICATIONS

Lo et al, "A pitch synchronous scheme for very low bit rate speech coding", IEE colloq (1992),No. 090, 1992.*
Yang et al, "High Quality Harmonic Coding at very low bit rates", ICASSP 1994.*
Lupini et al, "A 2.14 kB/s CELP Speech codec with class–dependent structure", ICASSP 1993.*

(List continued on next page.)

Primary Examiner—Krista Zele
Assistant Examiner—Michael N. Opsasnick
(74) Attorney, Agent, or Firm—Volpe and Koenig, P.C.

(57) ABSTRACT

A voice signal coding apparatus includes: a voice status detector detecting whether an input signal divided at predetermined frame intervals is a voice or a non-voice signal; a linear predictive analyzer outputting a linear predictive parameter associated with the input signal; a voice sound source predicting circuit; a non-voice sound source predicting circuit including a random signal generator; and a switch controller selecting either the voice or non-voice sound source predicting circuit from the detection result of the voice status detector, wherein the random signal gain is set in accordance with a value obtained by suppressing by a predetermined factor the gain obtained when a non-voice input signal is coded by the voice sound predicting circuit. When the input signal is a non-voice signal over a number of successive frames, a switch controller continuously outputs a linear predictive parameter for a previous frame; when a predetermined number of successive non-voice signal frames occurs, the parameter smoothing circuit calculates the weighted sum of the linear predictive parameter of the current frame and a linear predictive parameter used in non-voice frames and outputs a smoothed parameter; and a parameter memory stores the smoothed parameter. The voice status detector includes a threshold value adapting circuit increasing threshold value when the input signal level is greater than the current threshold value and decreasing it when the input signal level is smaller than the current threshold value, wherein the threshold value increasing factor is set to a value greater than a factor by which the threshold value is increased in a normal state.

20 Claims, 8 Drawing Sheets

U.S. PATENT DOCUMENTS

| | | | | |
|---|---|---|---|---|
| 5,293,449 | * | 3/1994 | Tzeng | 704/223 |
| 5,293,450 | * | 3/1994 | Kane et al. | 395/2.35 |
| 5,295,225 | * | 3/1994 | Kane et al. | 395/2.35 |
| 5,307,441 | * | 4/1994 | Tzeng | 704/222 |
| 5,414,796 | * | 5/1995 | Jacobs et al. | 395/2.3 |
| 5,490,231 | * | 2/1996 | Kane et al. | 395/2.35 |
| 5,539,858 | * | 7/1996 | Sasaki et al. | 395/2.21 |
| 5,633,982 | * | 5/1997 | Ganesan et al. | 395/2.42 |
| 5,657,420 | * | 8/1997 | Jacobs et al. | 395/2.32 |
| 5,677,985 | * | 10/1997 | Ozawa | 395/2.29 |
| 5,682,407 | * | 10/1997 | Funaki | 375/240 |
| 5,717,724 | * | 2/1998 | Yamazaki et al. | 375/346 |
| 5,729,655 | * | 3/1998 | Kolesnik et al. | 395/2.32 |
| 5,732,389 | * | 3/1998 | Kroon et al. | 704/223 |
| 5,734,789 | * | 3/1998 | Swaminathan et al. | 704/206 |
| 5,890,115 | * | 3/1999 | Cole | 704/258 |

OTHER PUBLICATIONS

Chui et al, "Low delay CELP coding at 8 kbps using classified voiced and unvoiced excitation codebooks", 1994 Speech, Image Processing, and Neural Networks, 1994.*

Andreas S. Spania, "Speech Coding: A Tutorial Review". Proceedings of the IEEE, vol. 82, No. 10, pp. 1541–1582, Oct. 1994.

* cited by examiner

VOICE SIGNAL CODING APPARATUS

BACKGROUND OF THE INVENTION

1. Field of the Invention

The present invention relates to a voice signal coding apparatus, and more particularly to a voice signal coding apparatus for converting a voice signal into compressed digital information and recording or transmitting the resultant information.

2. Related Art Statement

One widely-used technique of compressing a voice signal in a highly efficient manner is to code the voice signal using a linear predictive parameter representing a spectral envelope and also using a sound source parameter corresponding to a residual linear predictive signal. If such a voice coding technique based on the linear prediction is used, it is possible to obtain a synthesized voice having relative high quality via a transmission channel with a rather small capacity. Because of the above advantage as well as recent advancement in hardware technology, there are intensive research and development activities on various applications in a wide range.

Among various techniques based on the linear prediction, a well-known technique is CELP (code excited linear predictive coding) disclosed in a paper entitled "Improved speech quality and efficient vector quantization in SELP" (Kleijin et al., ICASP' 88 s4.4, pp. 155–158, 1988) in which an adaptive code book obtained from a repetition of past sound source signals is used.

The voice signal coding apparatus based on the linear prediction analysis has the advantage that high-quality coding performance can be obtained at rather low bit rates. This type of voice signal coding apparatus using the linear prediction analysis is based on the assumption that voice generated by a human generally has the property of periodicity and thus it is generally possible to well analyze a voice signal if the length of one frame is set to about 20 ms.

The conventional voice signal coding apparatus however has the disadvantage that although high quality is obtained for voice signal periods, high-quality coding cannot be obtained for non-voice signal periods. In particular, great degradation in the voice quality occurs if there is background noise greater than a certain level.

To achieve more efficient compression, it is known in the art to employ a variable rate coding technique in which the bit rate is varied in accordance with the status of a given voice signal, It is also known to mix a high-efficiency voice signal coding technique with a non-voice signal compression technique as disclosed, for example, in Japanese Examined Patent Publication No. 2-35996.

In the technique disclosed in Japanese Examined Patent Publication No. 2-35996, however, coding is performed in extremely different ways depending on whether an input signal is a voice signal or a non-voice signal, and thus reproduced sound becomes very unnatural at a transition between voice and non-voice periods.

The voice signal coding apparatus is thought of as having applications in a mobile telephone, a voice recording apparatus, etc. In these applications, the voice signal coding apparatus is expected to be used in various environments wherein there is background noise in many cases. Therefore, the problem of voice quality degradation has to be solved to realize a more attractive product.

In view of the above, the inventor of the present invention has proposed a high-performance voice signal coding apparatus capable of always providing high sound quality even regardless of whether the signal is a voice signal or a non-voice signal, as disclosed in Japanese Patent Application No. 7-268756. This coding apparatus includes: voice status detecting means for detecting whether an input signal divided into predetermined frame intervals is a voice signal or a non-voice signal; linear predictive analyzing means for outputting a spectrum parameter associated with the input signal; control means for controlling the linear predictive analyzing means such that when the detection result by the voice status detecting means indicates that the input signal is a non-voice signal over a predetermined number of successive frames, the linear predictive analyzing means continuously outputs the spectrum parameter employed for the predetermined number of previous frames as a spectrum parameter for the input signal; driving sound signal generating means for generating a driving sound source signal corresponding to a residual linear predictive signal; and a synthesizing filter for synthesizing a voice from the driving sound source signal in accordance with the spectrum parameter.

In the above technique proposed in Japanese Patent Application No. 7-268756, however, although it is possible to suppress the sound quality degradation which occurs when the spectrum parameter is switched at transition between voice and non-voice periods, sound quality degradation still occurs and no improvement is obtained if a non-voice signal continues over a long period.

One conventional technique to achieve a higher efficiency in compression of voice data is to mix a high-efficiency voice signal coding technique with a non-voice signal compression technique. One well-known non-voice signal compression technique is a technique called VAD (voice activity detection) in which it is judged whether a given input signal is a voice signal or a non-voice signal and recording on a recording medium or data transmission is stopped if the judgement indicates that the input signal is a non-voice signal.

Another well-known technique is the variable-rate voice signal coding technique in which the bit rate is varied depending on the status of an input signal.

A specific example of the technique is disclosed in a paper entitled "QCELP: The North American CDMA Digital Cellular Variable Rate Speech Coding Standard," (A. DeJaco, W. Gardner, P. Jacobs, and C. Lee, Proceedings IEEE Workshop on Speech Coding for Telecommunications, pp. 5–6, 1993).

In this technique, the threshold value is adapted over a wide range from an extremely low background noise level to a rather high background noise level by gradually increasing the threshold value starting from a small value thereby ensuring that the status of the input signal can be accurately detected regardless of ingress of background noise.

However, in the above technique, the time required for the detection means to reach a state in which the status of a given input voice signal can be correctly detected increases with the input signal level or the background noise level, and it is impossible to obtain a desirable coding efficiency before the detection means reaches the above state.

OBJECTS AND SUMMARY OF THE INVENTION

A first object of the present invention is to provide a high-quality voice signal coding apparatus capable of coding a voice signal in a high-quality fashion.

A second object of the present invention is to provide a voice signal coding apparatus capable of reproducing a natural sound even for signals in non-voice periods.

A third object of the present invention is to provide a voice signal coding apparatus having voice status detection means capable of adapting the threshold value quickly and thus detecting the voice status in a short time.

In brief, the voice signal coding apparatus according to the present invention includes: voice status detecting means for detecting whether an input signal divided at predetermined frame intervals is a voice signal or a non-voice signal; linear predictive analyzing means for outputting a linear predictive parameter associated with the input signal; linear predictive coding means for generating a driving sound source signal corresponding to a residual linear predictive signal, the linear predictive coding means including a voice sound source predicting part for coding a voice signal and a non-voice sound source predicting part for coding a non-voice signal; and coding mode selecting means for selecting either a voice signal coding mode or a non-voice signal coding mode in which the linear predictive coding means should perform its coding operation, in accordance with the detection result given by said voice status detecting means.

These object(s) and advantages of the present invention will become further apparent from the following detailed explanation.

DETAILED DESCRIPTION OF THE PREFERRED EMBODIMENTS

The present invention will be described in greater detail below with reference to preferred embodiments in conjunction with the accompanying drawings.

Figure 1:
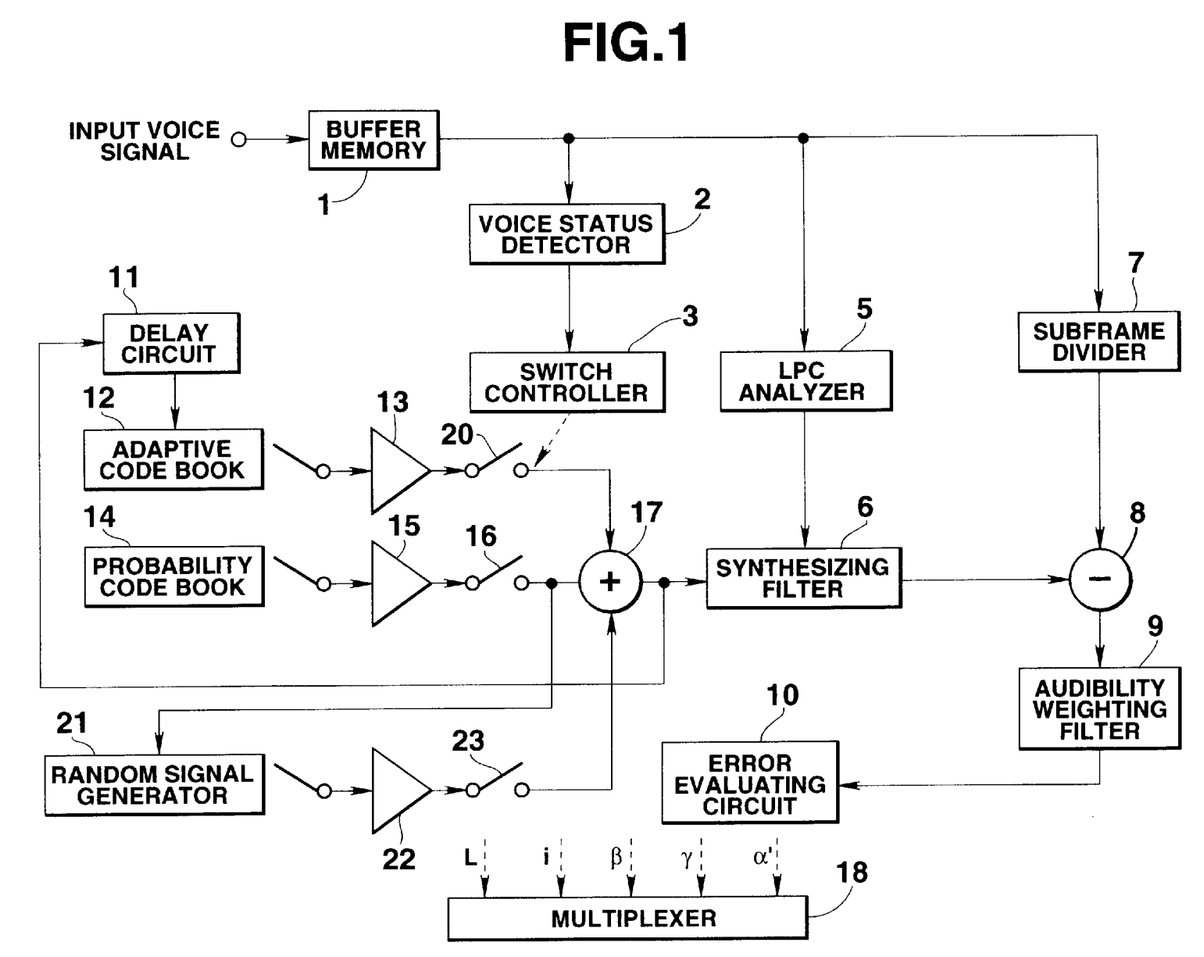
FIG. 1 is a block diagram illustrating the construction of a voice signal coding apparatus according to a first embodiment of the present invention.
Figure 2:
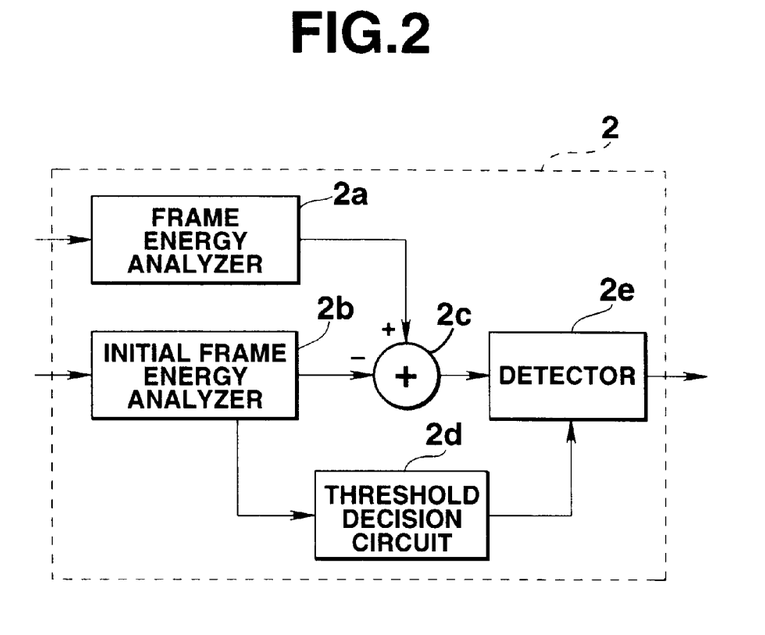
FIG. 2 is a block diagram illustrating the details of a voice status detector in the first embodiment.
Figure 3:
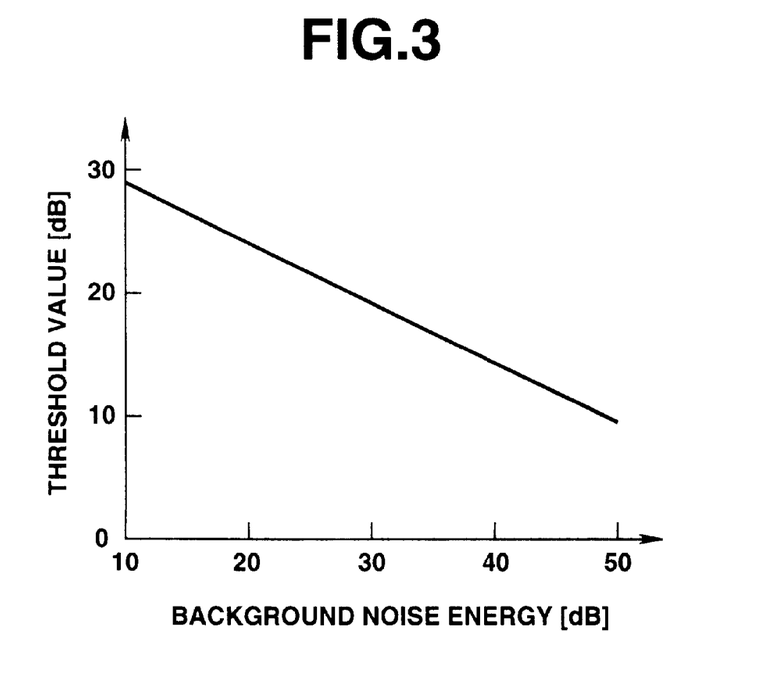
FIG. 3 is a graph illustrating an example of the threshold value associated with the voice status detector determined by a threshold value deciding circuit according to the first embodiment.

FIGS. 1 to 3 illustrate a first embodiment of a voice signal coding apparatus according to the present invention wherein the construction of the apparatus is shown in the form of a block diagram in FIG. 1.

The voice signal coding apparatus of the present embodiment is based on a combination of code excited linear predictive (CELP) coding and non-voice signal compression.

As shown in FIG. 1, an input signal is applied to a buffer memory 1. The output of the buffer memory 1 is divided into three signals wherein a first output signal is supplied to a subtractor 8 via a subframe divider 7, a second output signal is supplied to the input of an LPC analyzer 5 serving as linear predictive analyzing means, and a third output signal is supplied to a switch controller 3 serving as coding mode selecting means via a voice status detector 2 serving as voice status detecting means.

The switch controller 3 controls the on/off operation of a switch 20 which will be described later in accordance with the detection result given by the voice status detector 2. That is, when the detection result by the voice status detector 2 indicates that the input signal is a voice signal, the switch controller 3 turns on the switch 20 thereby enabling an adaptive code book 12 which will be described later. On the other hand, if the voice status detector 2 concludes that the input signal is a non-voice signal, the switch controller 3 turns off the switch 20 thereby disabling the adaptive code book 12.

The LPC analyzer 5 is connected to a synthesizing filter 6 which also receives a signal generated using the adaptive code book 12 which is one element forming a voice sound source predicting part and a probability code book 14 which is another element of the voice sound source predicting part.

The adaptive code book 12 is connected to a first input terminal of an adder 17 via a multiplier 13 and the switch 20. The probability code book 14 is connected to a second input terminal of the adder 17 via a multiplier 14 and a switch 16.

The output terminal of the adder 17 is connected to the input terminal of the subtractor 8 via the synthesizing filter 6, and also connected to the adaptive code book 12 via a delay circuit 11 which is another element of the voice sound source predicting part.

The output of the probability code book 14 is also supplied, via a multiplier and the switch 16, to a random signal generator 21 serving as a random signal generating means and a non-voice sound source predicting part. The output of the random signal generator 21 is connected to a third input terminal of the adder 17 via a multiplier 22 and a switch 23.

The output terminal of the synthesizing filter 6 is connected to the input terminal of an error evaluating circuit 10 via the subtractor 8 connected to the subframe divider 7 and further via an audibility weighting filter 9. The evaluation result by the error evaluating circuit 10 is fed back to the adaptive code book 12, the probability code book 14, and the multipliers 13 and 15 so that an optimum code is selected and the associated gain is adjusted to an optimum value. The above evaluation result is also supplied to a multiplexer 18.

In the voice signal coding apparatus described above, linear predictive coding means is formed by the delay circuit 11, the adaptive code book 12, the probability code book 14, the random signal generator 21, the multipliers 13, 15, and 22, the switches 16, 20, and 23, and the adder 17.

FIG. 2 is a block diagram illustrating the details of the voice status detector 2.

The output signal of the buffer memory 1 is applied to the voice status detector 2. In the voice status detector 2, the applied signal is divided into two signals such that one is supplied to a frame energy analyzer 2a and the other is supplied to an initial frame energy analyzer 2b.

The output of the frame energy analyzer 2a is connected to a first input terminal serving as a positive terminal of an adder 2c. The output of the initial frame energy analyzer 2b is connected to a second input terminal serving as a negative terminal of the adder 2c. The output of the initial frame energy analyzer 2b is also connected to a threshold decision circuit 2d.

The output terminals of the adder 2c and threshold decision circuit 2 d are both connected to a detector 2e whose output is supplied to the switch controller 3.

The signal flow through the voice signal coding apparatus having the construction shown in FIGS. 1 and 2 will be described below.

An original voice signal sampled at, for example, 8 kHz (or sampled at time intervals of ⅛ ms) is applied to the voice signal coding apparatus via the input terminal. The voice signal in a predetermined frame period (for example 20 ms in which there are 160 samples) is stored in the buffer memory 1.

The buffer memory 1 supplies the above input signal in units of frames to the subframe divider 7, the LPC analyzer 5, and the voice status detector 2.

The voice status detector 2 detects whether the input signal in a given frame is a voice signal or a non-voice signal, for example, in the manner described below.

In the voice status detector 2c onstructed as shown in FIG. 2, the frame energy analyzer 2a calculates the frame energy Ef associated with the input signal in accordance with equation 1 described below.

$$E_f = 10 \log_{10} \left\{ 1 + \sum_{n=0}^{N-1} s^2(n) \right\} \quad (1)$$

where s(n) is the input signal of an nth sample and N is the frame length.

The initial frame energy analyzer 2b calculates the initial frame energy Eb at the start of a coding operation in accordance with equation 1.

The threshold decision circuit 2d decides a threshold value depending on the background noise energy. For example, the threshold value is reduced in dB with the increase in the background noise energy in dB as shown in FIG. 3. The decided threshold value is supplied to the detector 2e.

The adder 2c receives the frame energy Ef at its positive input terminal and the initial frame energy Eb at its negative input terminal. The adder 2c adds these two signals. Thus, in effect, the initial frame energy Eb is subtracted from the frame energy Ef. The resultant subtracted value is supplied to the detector 2e.

The detector 2e compares the subtracted value with the threshold value. If the subtracted value is greater than the threshold value, the input signal frame is regarded as a voice signal frame. In the opposite case, the input signal frame is regarded as a non-voice signal frame.

Referring back to FIG. 1, the subframe divider 7 divides the input signal in each frame into subframes each having a predetermined period (for example 5 ms so that each subframe includes 40 samples). That is, the input signal in each frame is divided into first through fourth subframes, and thus four subframes are generated from each frame.

The LPC analyzer 5 performs linear predictive coding (LPC) analysis on the input signal and extracts a linear predictive parameter α representing the spectrum characteristic of the input signal. The extracted linear predictive parameter α is supplied to the synthesizing filter 6 and the multiplexer 18.

The delay L and gain β associated with the adaptive code book, and the index i and gain γ associated with the probability code book are determined in the manner described below.

The procedure of determining the delay L and gain β will be described first.

The delay circuit 11 produces a delay in the signal of the previous frame input to the synthesizing filter 6, that is the driving sound source signal, by an amount corresponding to the pitch cycle thereby producing an adaptive code vector.

For example, if it is assumed that the pitch cycle is equal to 40–167 samples, 128 kinds of signals delayed by 40–167 samples are generated as adaptive code vectors and stored in the adaptive code book 12.

During the above process, the switch 16 is maintained in an open state. In the multiplier 13, each adaptive code vector is multiplied by a varying gain value, and the result is directly supplied to the synthesizing filter 6 after passing through the adder 17.

The synthesizing filter 6 synthesizes a vector using the linear predictive parameter α'. The resultant synthesized vector is supplied to the subtractor 8. The subtractor 8 subtracts the synthesized vector from the original voice vector thereby producing an error vector. The obtained error vector is supplied to the audibility weighting filter 9.

The audibility weighting filter 9 performs a weighting process on the error vector taking into account audibility characteristics. The weighted error vector is then supplied to the error evaluating circuit 10.

The error evaluating circuit 10 calculates the mean square associated with the error vector, and searches for an adaptive code vector which gives a minimum mean square.

The resultant delay L and gain β are supplied to the multiplexer 18. In this way, the delay L and gain β associated with the adaptive code book 12 are determined.

The procedure of determining the index i and gain γ will now be described below.

The probability code book 14 stores, for example, 512 probability code vectors each having a dimension corresponding to the subframe length (40 in the above specific example) wherein each probability code vector is assigned its own index. During the above process, the switch 16 is maintained in a closed state.

With the multiplier 13, the optimum adaptive code vector obtained in the above process is multiplied by the optimum gain β, and the result is supplied to the adder 17.

With the multiplier 15, each probability code vector is multiplied by a varying gain value, and the result is supplied to the adder 17. The adder 17 determines the sum of the optimum adaptive code vector multiplied by the optimum gain β and each code vector. The result is then supplied to the synthesizing filter 6.

After that, a process similar to that employed in the determination of the above adaptive code book parameters is performed. That is, the synthesizing filter 6 synthesizes a vector using the linear predictive parameter α' and supplies the resultant synthesized vector to the subtractor 8.

The subtractor 8 subtracts the synthesized vector from the original voice vector thereby producing an error vector. The obtained error vector is supplied to the audibility weighting filter 9.

The audibility weighting filter 9 performs a weighting process on the error vector taking into account audibility characteristics. The weighted error vector is then supplied to the error evaluating circuit 10.

The error evaluating circuit 10 calculates the mean square associated with the error vector, and searches for an adaptive code vector which gives a minimum mean square. The resultant index i and gain γ are supplied to the multiplexer

18. In this way, the index i and gain γ associated with the probability code book 14 are determined.

The multiplexer 18 transmits, in a multiplexed fashion, the quantized linear predictive parameter α', the delay L and gain β associated with the adaptive code book, and the index i and gain γ associated with the probability code book.

When it is concluded that the input signal in a given frame is a non-voice signal, the gain of the sound source signal is determined as follows.

If the voice status detector 2 concludes that the input signal is a non-voice signal, LPC analysis is performed first as in the case of a voice signal. The transmission of the LPC information allows the characteristic features of the input signal to be maintained to a certain degree even for a non-voice signal.

When the input signal is regarded as a non-voice signal, the switch controller 3 turns off the switch 20 so that the adaptive code book 12 is disabled, as described above. Therefore, in this case, a random signal generated by the random signal generator 21 is employed as the sound source signal.

The gain associated with the random signal is determined as follows. First, the input signal is assumed to be a voice signal. On this assumption, the probability code book 14 is searched and the sound source signal is predicted.

The random signal generator 21 calculates the energy of the predicted sound source signal. The gain associated with the sound source signal is adjusted so that the energy of the generated random signal becomes equal to the energy of the sound source signal.

Furthermore, the gain associated with the random signal is set to a value suppressed by a predetermined factor, for example ½, relative to the energy of the sound source signal predicted on the assumption that the input signal is a voice signal.

Since the gain associated with the sound source signal is set as described above in accordance with the energy of the sound source signal predicted on the assumption that the input signal is a voice signal, unnaturalness at transition between a voice period and a non-voice period is reduced.

Furthermore, since the energy of the sound source signal predicted on the assumption that the input signal is a voice signal is suppressed by a certain ratio, the background noise, which offends the ear when the input signal is a non-voice signal, is suppressed.

In a voice signal decoding apparatus corresponding to the voice signal coding apparatus described above, decoding can be performed in a manner similar to the conventional technique described in Japanese Patent Application No. 7-268756.

The method employed by the voice status detector to detect the status of the input signal is not limited to that described above, but other methods may also be employed.

Furthermore, although in the above specific embodiment the voice signal coding apparatus is based on the code excited linear predictive coding technique, the invention may also be applied to any type of voice signal coding apparatus as long as it represents a signal using a linear predictive parameter and a driving sound source signal corresponding to a residual linear predictive signal.

If information representing whether the signal is a voice or non-voice signal is transmitted together with a coding parameter, and if the decoding apparatus includes a switch control circuit and a switch similar to those in the coding apparatus so that the switch is controlled in accordance with the information representing whether the signal is a voice or non-voice signal, it is possible to realize a variable bit rate coding/encoding apparatus capable of coding a voice signal with a higher compression efficiency.

In the voice signal coding apparatus according to the first embodiment, as described above, the gain associated with the sound source signal in a non-voice period is set on the basis of the energy of the sound source signal predicted on the assumption that the input signal is a voice signal. This reduces unnaturalness at transition between voice and non-voice periods and it is possible to compress a non-voice signal without causing degradation in the naturalness of the reproduced sound.

Figure 4:
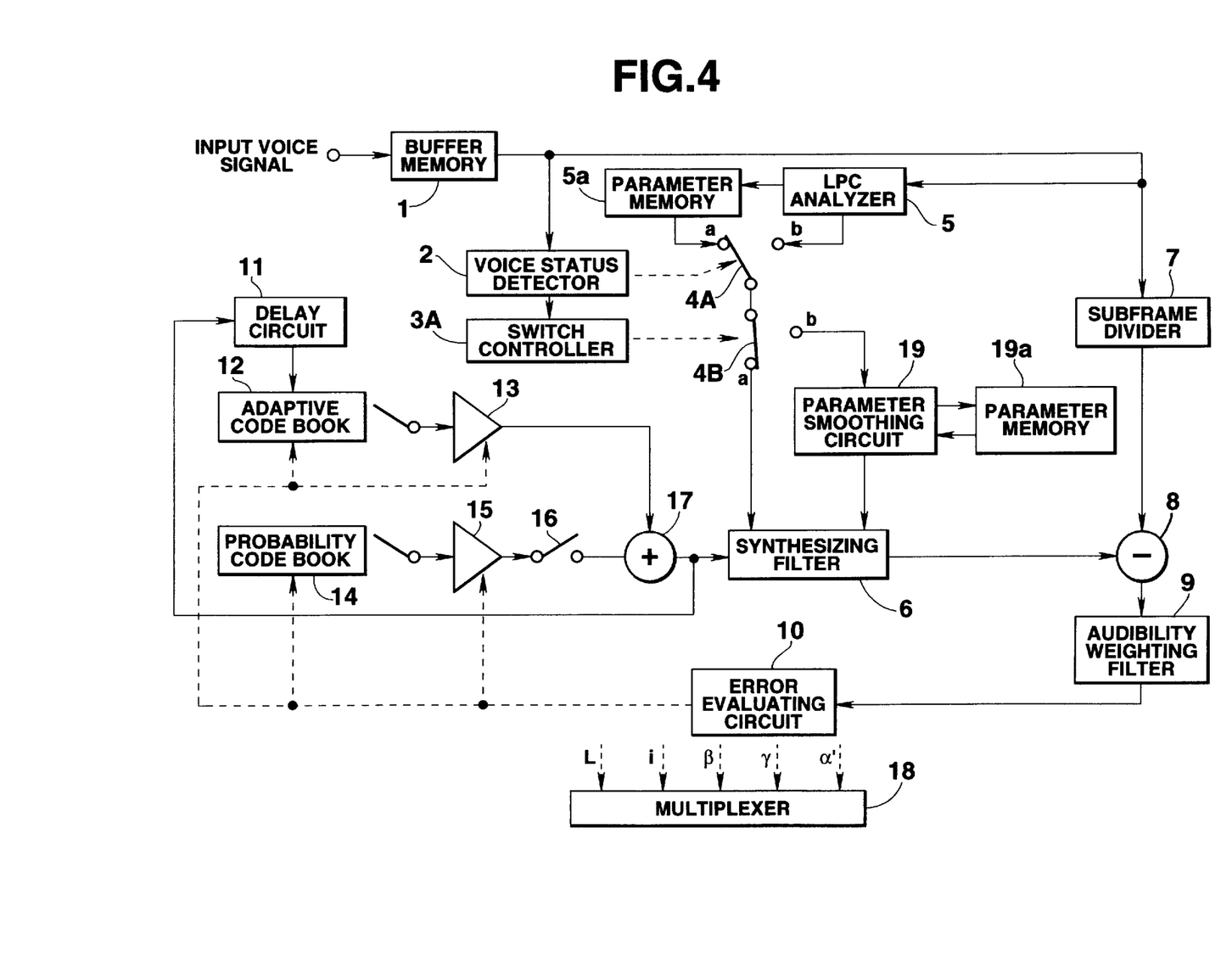
FIG. 4 is a block diagram illustrating the construction of a voice signal coding apparatus according to a second embodiment of the present invention.
Figure 5:
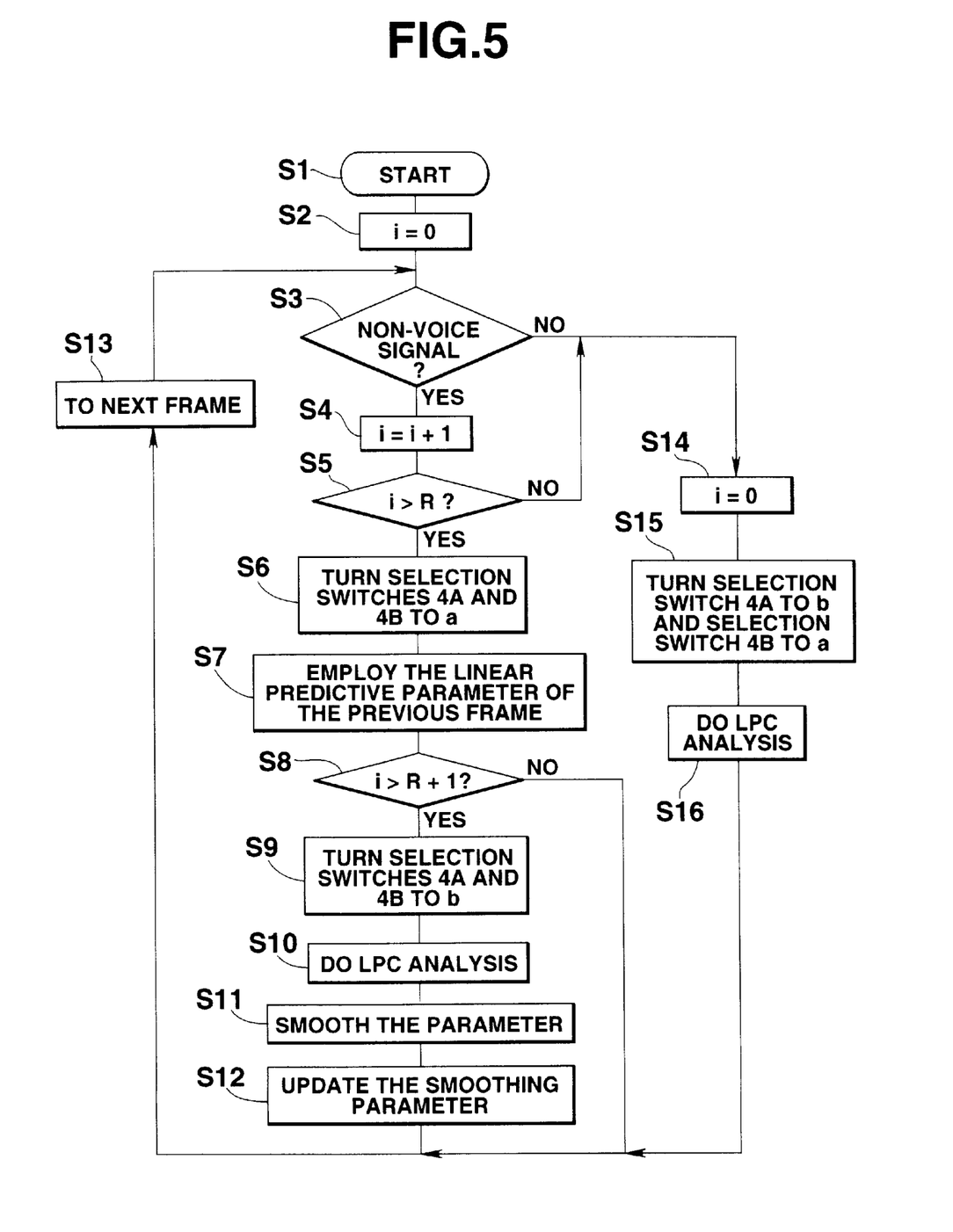
FIG. 5 is a flowchart illustrating the operation of the voice signal coding apparatus of the second embodiment.

FIGS. 4 and 5 illustrate a second embodiment of a voice signal coding apparatus according to the present invention wherein the construction of the apparatus is shown in the form of a block diagram in FIG. 4. In this second embodiment, similar elements or parts to those in the first embodiment described above are denoted by similar reference numerals, and they are not described in further detail here. Instead, the following description is mainly concerned with different parts.

In the voice signal coding apparatus of this second embodiment, as described in FIG. 4, one of the three output terminals of a buffer memory 1 is connected via a voice status detector 2 to a switch controller 3A serving as control means for controlling switches 4A and 4B which will be described later.

An LPC analyzer 5 is connected to an input terminal b of the switch 4A. The LPC analyzer 5 is also connected to a parameter memory 5a so that the output of the LPC analyzer 5 is stored in the parameter memory 5a. The parameter memory 5a is connected to an input terminal an of the switch 4A.

The output terminal of the switch 4A is connected to the input terminal of a switch 4B located next to the switch 4A. An output terminal an of the switch 4B is connected to a synthesizing filter 6, and an output terminal b is connected to a parameter smoothing circuit 19 serving as means for smoothing a linear predictive parameter associated with a non-voice frame.

The parameter smoothing circuit 19 is connected to a parameter memory 19a serving as parameter storage means for storing the output of the parameter smoothing circuit 19 so that the stored data is read as required. The output of the parameter smoothing circuit 19 is connected to the synthesizing filter 6.

In this embodiment, the switch 20 employed in the first embodiment is not used.

In the voice signal coding apparatus having the above construction, linear predictive coding means is formed by a delay circuit 11, an adaptive code book 12, a probability code book 14, multipliers 13 and 15, the switch 16, and an adder 17.

The voice status detector 2 in the present embodiment is constructed and operates in the same manner as in the first embodiment described above with reference to FIG. 2.

The signal flow in the voice signal coding apparatus of the present embodiment will be described below.

The LPC analyzer 5 performs linear predictive coding (LPC) analysis on the input signal and extracts a linear predictive parameter α representing the spectrum characteristic of the input signal. The extracted linear predictive parameter α is supplied to the parameter memory 5a and also to the synthesizing filter 6 or the parameter smoothing circuit 19 via the switches 4A and 4B.

The operation of the switch controller 3A will be described below with reference to the flowchart shown in FIG. 5.

At the beginning of a coding operation (step S1), variable i representing the number of successive non-voice frames is set to 0 (step S2).

Then it is judged whether the detection result by the voice status detector 2 indicates that the input signal is a voice signal or a non-voice signal (step S3). If the input signal is a non-voice signal, i is incremented by 1 (step S4). The variable i is compared with a predetermined value R (for example 5) in step S5. If i is greater than R, both the switches 4A and 4B are turned to the side a (step S6) so that the linear predictive parameter associated with the previous frame output from the parameter memory 5a is further used in the following frame (step S7).

Then i is compared with R+1 (step S8). If it is concluded that i is greater than R+1, both the switches 4A and 4B are turned to side b (step S9) so that the result of the LPC analysis performed by the LPC analyzer is supplied to the parameter smoothing circuit 19 (step S10).

Then the parameter smoothing circuit 19 smooths the parameter as described below (step S11).

In advance, initial k parameter Noise_α associated with background noise is prepared and stored in the parameter memory 19a. The smoothing is accomplished by performing weighting using Noise_α in accordance with equation 2 described below.

$$\alpha[i] = \frac{15}{16} \cdot \text{Noise}\_\alpha[i] + \frac{1}{16} \cdot \alpha[i] \quad (2)$$

The initial k parameter Noise_α associated with background noise is a linear predictive parameter representing background noise in an environment such as in an office.

In equation 2, a greater weighting factor is given to the initial k parameter associated with background noise Noise_α than to the linear predictive parameter α[i] associated with a current frame so that the effect due to a fluctuation in the parameter α[i] is suppressed.

Then immediately after the above process, the initial k parameter Noise_α[i] associated with background noise is updated in accordance with equation 3 described below (step S12).

$$\text{Noise}\_\alpha[i] = \alpha[i] \quad (3)$$

Then the process waits for a next frame (step S13).

If it is concluded in step S8 that i is equal to or less than R+1, the process also goes to step S13.

As described above, the fluctuation in the sound source signal in a non-voice period is suppressed while reflecting the result of the LPC analysis.

On the other hand, if it is concluded in step S3 that the input signal is a voice signal, variable i representing the number of successive non-voice frames is reset to 0 (step S14). The switch 4A is then turned to the side b while the switch 4B is turned to the side a (step S15). LPC analysis is then performed and the linear predictive parameter is updated (step S16). After that, the process goes to step S13 and waits for a next frame.

If it is concluded in step S5 that i is equal to or less than R, the process also goes to step S14.

In the voice signal coding apparatus of the second embodiment described above, when the input signal is a non-voice signal over a predetermined number of or greater number of successive frames, the fluctuation in the parameter from frame to frame is suppressed and thus it is possible to achieve a high-quality voice signal coding operation even in a non-voice signal period.

Figure 6:
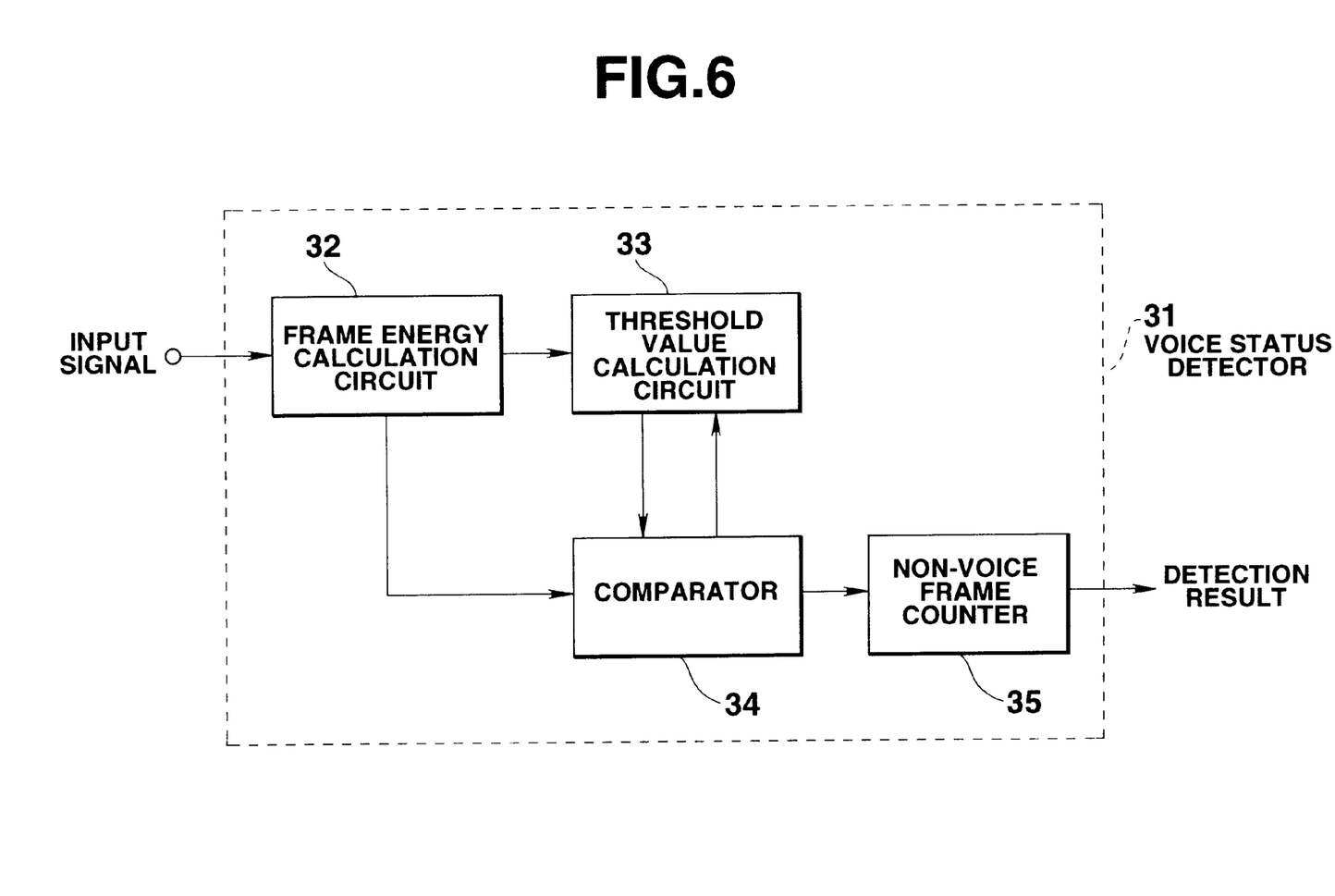
FIG. 6 is a block diagram illustrating the construction of a voice status detector according to the third embodiment of the present invention.

FIGS. 6–8 and 9A–9E illustrate a third embodiment of the invention wherein FIG. 6 is a block diagram illustrating the construction of a voice status detector of the present embodiment. In this third embodiment, similar elements or parts to those in the first or second embodiment described above are denoted by similar reference numerals, and they are not described in further detail here. Instead, the following description is mainly concerned with different parts.

This third embodiment has a particular feature in the construction of the voice status detector as described below.

That is, as shown in FIG. 6, the voice status detector 31 serving as voice status detecting means includes: a frame energy calculating circuit 32 serving as level measuring means for calculating the energy level of an input signal for each frame; a threshold value calculating circuit 33 for calculating the threshold value on the basis of the output of the frame energy calculating circuit 32 and the output of the threshold value calculating circuit 33 serving as threshold value adapting means which will be described later; a comparator 34 for comparing the output of the frame energy calculating circuit 32 with the output of the threshold value calculating circuit 33 and outputting the comparison result; and a non-voice frame counter 35 which counts the number of successive non-voice frames whose frame energy has been regarded by the comparator 34 as being less than the threshold value, and which judges whether the input signal is a non-voice signal or not and outputs the result of the judgement wherein in the judgement the input signal is regarded as a non-voice signal when the above counted number exceeds a predetermined value.

Figure 7:
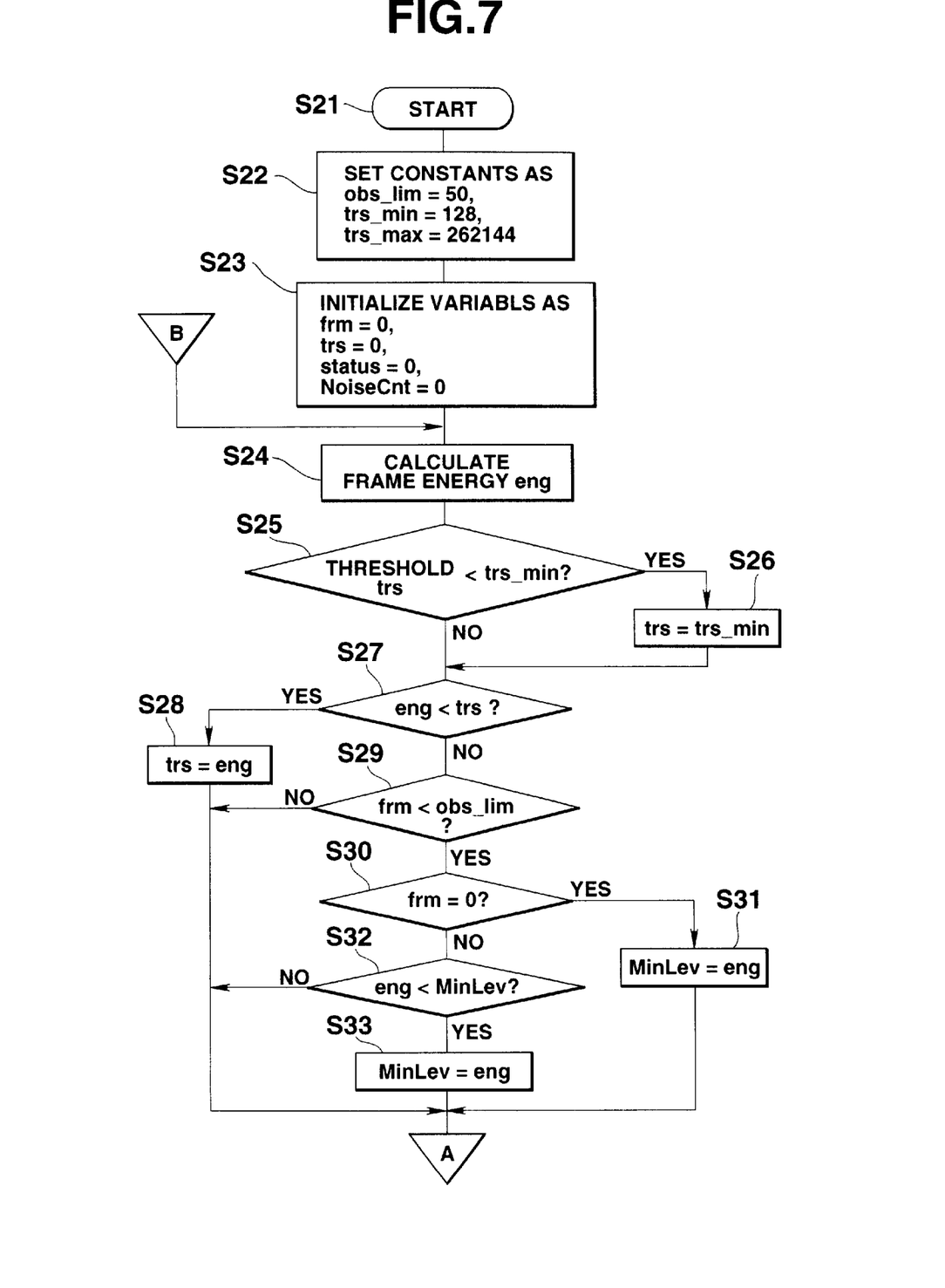
FIG. 7 is a flowchart illustrating a part of the operation of the voice status detector of the third embodiment.
Figure 8:
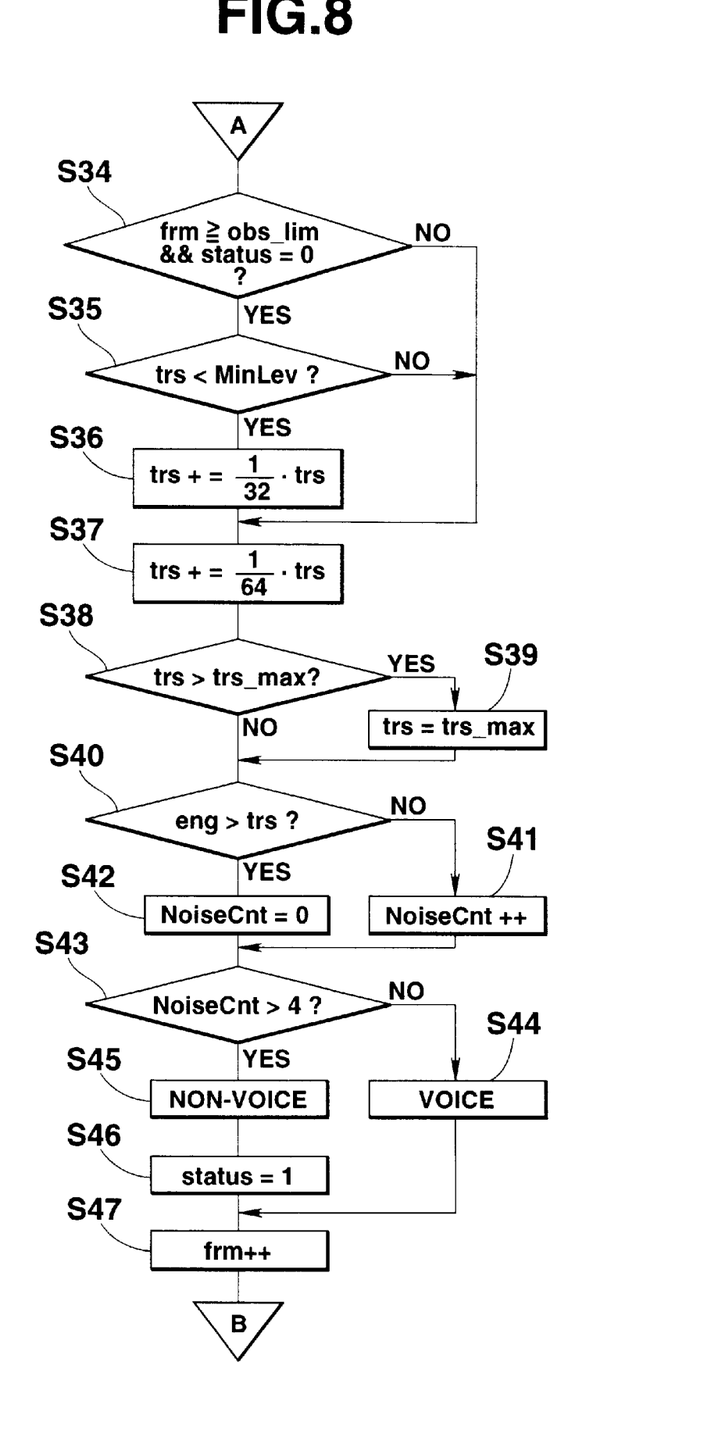
FIG. 8 is a flowchart illustrating another part of the operation of the voice status detector of the third embodiment.

FIG. 7 is a flowchart illustrating a part of the operation of the voice status detector 31, and FIG. 8 is a flowchart illustrating another part of the operation of the voice status detector 31.

At the beginning of the operation (step S21), various constants are set to proper values (step S22). For example, obs_lim, trs_min, and trs_max are set 50, 128, and 262144, respectively, where obs_lim is the number of frames observed to determine the ratio by which the threshold value is to be increased, trs_min is the lower limit of the threshold value, and trs_max is the upper limit of the threshold value.

Then various variables are initialized (step S23). More specifically, frm, trs, status, and NoiseCnt are all set to 0 where frm is the current frame number, trs is the threshold value, status is the status of the setting of the threshold value increasing ratio, and NoiseCnt is the number of hanging-over frames.

Then the frame energy eng is calculated for example in accordance with equation 4 described below (step S24).

$$eng = \frac{1}{N} \sum_{n=0}^{N-1} s^2(n) \quad (4)$$

where s(n) is the input signal of an nth sample and N is the frame length.

Then the threshold value trs is compared with the lower limit trs_min (step S25). If the threshold value trs is less than the lower limit trs_min, the threshold value is set to the lower limit trs_min (step S26).

If it is concluded in step S25 that the threshold value trs is equal to or greater than the lower limit trs_min, or if step S26 is complete, then the process goes to step S27 to judge whether the frame energy eng is less than the threshold value trs. If the frame energy eng is less than the threshold value trs, the threshold value trs is updated so that trs=eng (step S28).

On the other hand if it is concluded in step 27 that the frame energy eng is equal to or greater than the threshold value trs, the process goes to step S29 to judge whether the current frame number frm is less than the number of frames to be observed obs_lim. In the above specific example in which the constants are set as in step S22, the judgement is performed in such a manner as to judge whether the number of frames which have been already processed after the start of the process is less than 50.

If frm<obs_lim, then the process goes to step S30 to further judge whether the current frame number frm is equal to 0. If the current frame number is equal to 0, MinLev is set to a value equal to eng (step S31). If the current frame number is not equal to 0, the process goes to step S32 to judge whether the frame energy eng is less than MinLev.

If the frame energy eng is less than MinLev, MinLev is updated so that MinLev=eng (step S33). In steps S30 to S33, the lowest frame energy of those of 50 frames counted from the start of the process is given as MinLev.

If any of steps S28, S31, S33 is complete or if it is concluded in step S29 that the current frame number is equal to or greater than the number of frames to be observed obs_lim, or if it is concluded in step S32 that the frame energy eng is equal to or greater than MinLev, then the process goes to step S34 to judge whether the current frame number frm is equal to or greater than the number of frames to be observed obs_lim and the increasing ratio setting status is equal to 0. That is, it is judged whether the number of frames which have already been processed is equal to or greater than 50 and none of these frames are regarded as a non-voice frame. (in step S34, "&&" denotes logical AND.)

If it is concluded affirmatively in step S34, the process goes to step S35 to judge whether the threshold value trs is less than MinLev. If the threshold value trs is less than MinLev, the process goes to step S36 to increase the threshold value trs by 1/32 of the current threshold value (refer to equation 9 which will be described later). (In step S36, or elsewhere, "+=" denotes the operation of adding the value on the right-hand side to the current value.)

If step S36 is completed or if the conclusion in step S35 is negative, the process goes to step S37 to increase the threshold value trs by 1/64 of the current threshold value (refer to equations 5 and 9 which will be described later).

In step S37, the increasing ratio is given a normal value while the increasing ratio given in step S36 is greater than the normal ratio.

Then in step S38, it is judged whether the threshold value trs is greater than the upper limit trs_max. If the threshold value trs is greater than the upper limit trs_max, the threshold value is updated such that the threshold value trs becomes equal to the upper limit trs_max (step S39).

If step S39 is completed or if the conclusion in step S38 is negative, then the process goes to step S40 to judge whether the frame energy eng is greater than the threshold value trs. If the conclusion of the judgement is negative, the process goes to step S41 to increment the count NoiseCnt of hanging-over frames. (In step S41 or elsewhere, "++" denotes the incrementing operation.) If the conclusion in step S41 is positive, the process goes to step S42 and the count NoiseCnt of hanging-over frames is reset to 0.

If step S41 or S42 is completed, the process goes to step S43 to judge whether the count NoiseCnt of the hanging-over frames is greater than 4. If no, then the input signal is regarded as a voice signal and thus the process goes to step S44. If the judgement conclusion in step S43 is affirmative, the input signal is regarded as a non-voice signal and thus the process goes to step S45 and then the increasing ratio setting status is set to 1 in step S46. When the increasing ratio setting status is in a "1" state, step S34 concludes negatively and thus step S36, in which the threshold value would otherwise be increased by the high ratio, is skipped, but instead the threshold is increased only by the normal amount in step S37.

If step S44 or S46 is completed, the current frame number frm is incremented (step S47), and then the process returns to step S24 to process the next frame.

In the present embodiment, as described above, the minimum value MinLev of the frame energy eng for 50 frames (24 ms×50=1.2 s) after the start of a coding operation is determined and the threshold value trs is compared with the minimum value MinLev. If the threshold value trs is smaller than the minimum value MinLev, then the threshold value trs is increased by the large ratio. However, if once a non-voice signal is detected, the increasing ratio associated with threshold value is returned to the normal value so that the threshold value trs is settled quickly.

More specifically, the threshold value can be adapted at an improved settling speed as described below with reference to some equations.

When the increasing ratio associated with the threshold value trs is set to the normal value as given in step S37, the threshold value trs' of the next frame is given by $$trs' = trs + \frac{1}{64} \cdot trs = \frac{65}{64} \cdot trs \qquad (5)$$

Thus, as long as the frame energy eng for the frame is smaller than the threshold value for that frame, the threshold value trs_n for the nth frame is given by $$trs\_n = \left(\frac{65}{64}\right)^n \cdot trs\_0 \qquad (6)$$

where trs_0 is the initial threshold value.

Therefore, in order for the threshold value to become twice the initial value, $$\left(\frac{65}{64}\right)^n = 2 \qquad (7)$$

Thus $$n = \log_{\left(\frac{65}{64}\right)} 2 = \frac{\log_{10} 2}{\log_{10}\left(\frac{65}{64}\right)} \approx 44.7 \qquad (8)$$

Therefore, 45 frames are required to reach the threshold value which is twice the initial value.

On the other hand, if the increasing ratio associated with the threshold value is given a large value in step S36 in addition to step S37, the threshold value trs' for the next frame is given by $$trs' = \left(trs + \frac{1}{32} \cdot trs\right) + \frac{1}{64} \cdot \left(trs + \frac{1}{32} \cdot trs\right) \qquad (9)$$

$$= \frac{65}{64} \cdot \frac{33}{32} trs$$

Thus, as long as the frame energy eng for the frame is smaller than the threshold value for that frame, the threshold value trs_n for the nth frame is given by $$trs\_n = \left(\frac{65}{64} \cdot \frac{33}{32}\right)^n \cdot trs\_0 \tag{10}$$

Therefore, in order for the threshold value to become twice the initial value, $$\left(\frac{65}{64} \cdot \frac{33}{32}\right)^n = 2 \tag{11}$$

Thus $$n = \log_{\left(\frac{65}{64} \cdot \frac{33}{32}\right)} 2 = \frac{\log_{10} 2}{\log_{10}\left(\frac{65}{64} \cdot \frac{33}{32}\right)} \approx 15.0 \tag{12}$$

Therefore, only 15 frames are required in order for the threshold value to reach the value which is twice the initial value.

FIGS. 9A–9E illustrate the operation of detecting the voice status using the voice status detector 31 in accordance with the algorithm described above.

Figures 9A, 9B, 9C:
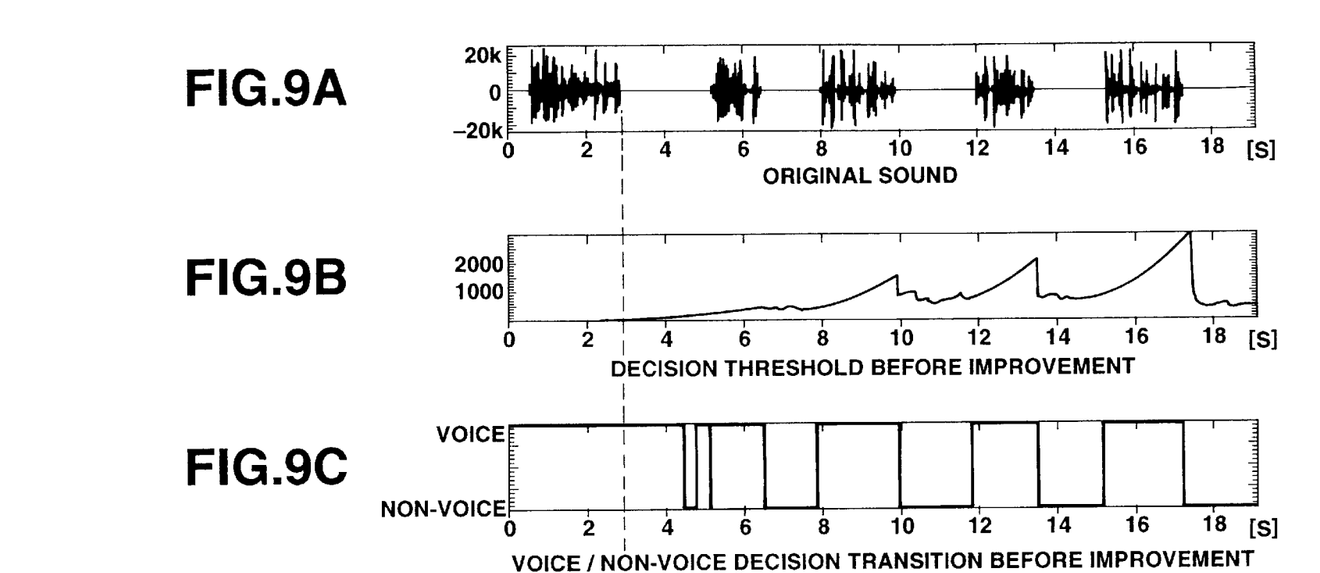
FIGS. 9A–9E are time charts illustrating the operation of detecting the voice status by the voice status detector according to the third embodiment wherein the operation of detecting the voice status according to a conventional voice status detector.

FIG. 9A illustrates an original sound. In FIG. 9A, after a first voice signal period, there is a non-voice signal period starting at the location denoted by the broken line. FIG. 9B illustrates a threshold value which varies in a conventional manner in response to the original sound. The setting of the threshold value shown in FIG. 9B results in an incorrect judgement as shown in FIG. 9C that a certain part of a non-voice signal period immediately after its start is regarded as a voice signal period.

Figure 9D:
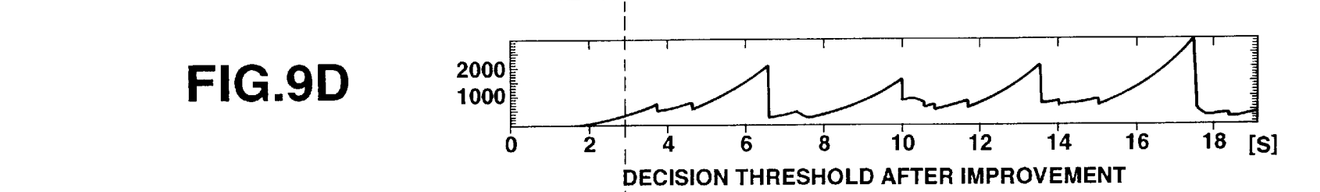
Figure 9E:
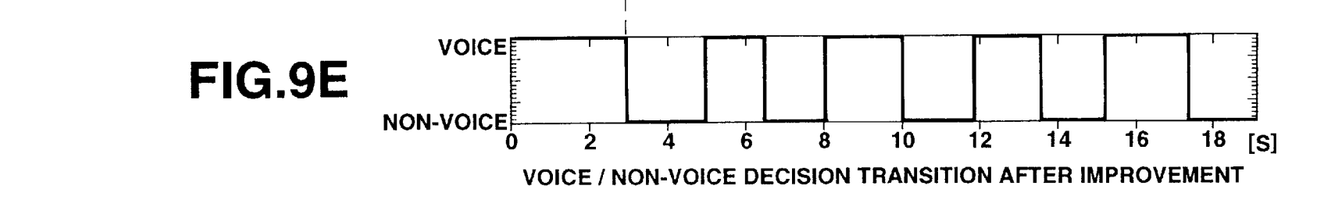

In contrast, in the present embodiment, the threshold value varies in the manner as shown in FIG. 9D, and thus the transition, denoted by the broken line, between the voice signal period and the following non-voice signal period can be detected accurately as shown in FIG. 9E.

In the specific embodiment described above, the increasing ratio associated with the threshold value is determined on the basis of the relative value of the threshold trs with respect to the minimum value MinLev of the frame energy eng detected for 50 frames counted from the start of a coding process. However, the manner of determining the increasing ratio in the present invention is not limited to that. For example, the increasing ratio associated with the threshold value trs is determined in accordance with the magnitude of the difference between the threshold value trs and MinLev.

In the third embodiment, as described above, the voice status can be detected accurately in accordance with the adaptive threshold value wherein the threshold value can be adapted at a higher speed, than in the conventional technique, without having a delay before detecting the voice status correctly even when the input signal level or the background noise level becomes high.

In this invention, it is apparent that working modes different in a wide range can be formed on the basis of the present invention without departing from the spirit and scope of the invention. This invention is not restricted by any specific embodiment except as may be limited by the appended claims.

What is claimed is:

1. A voice signal coding apparatus comprising:
   a voice status detector for detecting whether an input voice signal divided into predetermined frame intervals, is a voice signal or a non-voice signal during each frame interval, a detection that each frame interval is voiced or non-voiced being based on a frame energy of each frame interval;
   a linear predictive analyzer for outputting a linear predictive parameter associated with said input signal;
   a linear predictive coding circuit for generating a driving sound source signal corresponding to a residual linear predictive signal, said linear predictive coding circuit including a voice sound source predicting part for coding a voice signal and a non-voice sound source predicting part for coding a non-voice signal; and
   a coding mode selector for selecting either a voice signal coding mode or a non-voice signal coding mode in which said linear predictive coding circuit performs a coding operation, in accordance with a result given by said voice status detector.

2. A voice signal coding apparatus comprising:
   a voice status detector for detecting whether an input voice signal divided into predetermined frame intervals, is a voice signal or a non-voice signal during each frame interval, a detection that each frame interval is voiced or non-voiced being based on a frame energy of each frame interval;
   a linear predictive analyzer for outputting a linear predictive parameter associated with said input signal;
   a linear predictive coding circuit for generating a driving sound source signal corresponding to a residual linear predictive signal, said linear predictive coding circuit including a voice sound source predicting part for coding a voice signal and a non-voice sound source predicting part for coding a non-voice signal; and
   a coding mode selector for selecting either a voice signal coding mode or a non-voice signal coding mode in which said linear predictive coding circuit performs a coding operation, in accordance with a result given by said voice status detector;
   said non-voice sound source predicting part including a random signal generator for generating a random signal representing a sound source signal;
   data coded by said non-voice sound source predicting part including said linear predictive parameter, said random signal, and a gain associated with said random signal; and
   said gain associated with said random signal being set in accordance with a gain obtained when said voice sound source predicting part codes a non-voice signal given as the input signal.

3. A voice signal coding apparatus according to claim 2, wherein said gain associated with the random signal is set in accordance with a value obtained by suppressing, by a predetermined factor, a gain obtained when said voice sound source predicting part codes said non-voice signal given as the input signal.

4. A voice signal coding apparatus comprising:
   a voice status detector for detecting whether an input voice signal divided into predetermined frame intervals, is a voice signal or a non-voice signal during each frame interval, a detection that each frame interval is voiced or non-voiced being based on a frame energy of each frame interval;
   a linear predictive analyzer for outputting a linear predictive parameter associated with said input signal;
   a linear predictive coding circuit for generating a driving sound source signal corresponding to a residual linear predictive signal, said linear predictive coding circuit including a voice sound source predicting part for coding a voice signal and a non-voice sound source predicting part for coding a non-voice signal;

a coding mode selector for selecting either a voice signal coding mode or a non-voice signal coding mode in which said linear predictive coding circuit performs a coding operation, in accordance with a result given by said voice status detector;

a controller for controlling the linear predictive parameter such that when the detection result by said voice status detector indicates that the input signal is a non-voice signal over a predetermined number of successive frames, the linear predictive parameter employed for a previous frame is continuously employed as the linear predictive parameter for the input signal;

a smoothing circuit for smoothing the linear predictive parameter for use in non-voice frames in such a manner that when a number of successive frames regarded as including a non-voice signal exceeds said predetermined number, smoothing is performed between a previously-prepared linear predictive parameter for use in non-voice frames and a linear predictive parameter associated with the current frame, and the resultant smoothed linear predictive parameter is output.

5. A voice signal coding apparatus according to claim 4, wherein a value of the linear predictive parameter predetermined for particular background noise is employed as an initial value of said linear predictive parameter for use in non-voice frames.

6. A voice signal coding apparatus according to claim 4, wherein said smoothing circuit for smoothing the linear predictive parameter for use in non-voice frames performs smoothing with a greater weighting factor for said linear predictive parameters for use in non-voice frames than that for the linear predictive parameter for the current frame.

7. A voice signal coding apparatus according to claim 5, wherein said smoothing circuit for smoothing the linear predictive parameter for use in non-voice frames performs smoothing with a greater weighting factor for said linear predictive parameter for use in non-voice frames than that for the linear predictive parameter for the current frame.

8. A voice signal coding apparatus according to claim 4, further comprising:

a parameter storing device for storing a linear predictive parameter output by said smoothing circuit for smoothing the linear predictive parameter for use in non-voice frames so that said linear predictive parameter stored may be used as a linear predictive parameter for use in non-voice frames to smooth a next frame.

9. A voice signal coding apparatus according to claim 5, further comprising:

a parameter storing device for storing a linear predictive parameter output by said smoothing circuit for smoothing the linear predictive parameter for use in non-voice frames so that said linear predictive parameter stored may be used as a linear predictive parameter for use in non-voice frames to smooth a next frame.

10. A voice signal coding apparatus according to claim 6, further comprising:

a parameter storing circuit for storing a linear predictive parameter output by said smoothing circuit for smoothing the linear predictive parameter for use in non-voice frames so that said linear predictive parameter stored may be used as a linear predictive parameter for use in non-voice frames to smooth a next frame.

11. A voice signal coding apparatus comprising:

a voice status detector for detecting whether an input voice signal divided into predetermined frame intervals, is a voice signal or a non-voice signal during each frame interval, a detection that each frame interval is voiced or non-voiced being based on a frame energy of each frame interval;

a linear predictive analyzer for outputting a linear predictive parameter associated with said input signal;

a linear predictive coding circuit for generating a driving sound source signal corresponding to a residual linear predictive signal, said linear predictive coding circuit including a voice sound source predicting part for coding a voice signal and a non-voice sound source predicting part for coding a non-voice signal;

a coding mode selector for selecting either a voice signal coding mode or a non-voice signal coding mode in which said linear predictive coding circuit performs a coding operation, in accordance with a result given by said voice status detector;

said voice signal status detector comprising:

a level measuring circuit for measuring a level of an input signal divided at predetermined frame intervals;

a comparator for comparing the level of said input signal measured by said level measuring circuit with a threshold value provided as a criterion for determining whether said input signal is a voice signal or a non-voice signal and then outputting the comparison result; and a threshold value adapting circuit by which said threshold value is increased by a predetermined factor when said comparator has determined that the level of said input signal is greater than a current threshold value, while said threshold value is decreased when said comparator has determined that the level of said input signal is smaller than the current threshold value, wherein said predetermined factor by which said threshold value is increased is set in accordance with a difference between the current threshold value and a minimum level of the input signal during a predetermined period of past time.

12. A voice signal coding apparatus according to claim 11, wherein when the level of said input signal is regarded by said comparator as smaller than the current threshold value, and said threshold value adapting circuit employs said level of said input signal as a new threshold value.

13. A voice signal coding apparatus according to claim 11, wherein when a current threshold value is compared with a minimum level of the input signal during a predetermined period of time from a start of a voice status detecting process, if said current threshold value is smaller than said minimum level by an amount equal to or greater than a predetermined value, said threshold value adapting circuit sets said factor, by which the threshold value is increased, to a predetermined value which is greater than a factor by which the threshold value is increased in a normal state, and resets said factor, by which the threshold value is increased, to said normal value when said input signal is regarded as a non-voice signal.

14. A voice signal coding apparatus according to claim 12, wherein when a current threshold value is compared with a minimum level of the input signal during a predetermined period of time from a start of a voice status detecting process, if said current threshold value is smaller than said minimum level by an amount equal to or greater than a predetermined value, said threshold value adapting circuit sets said factor, by which the threshold value is increased, to a predetermined value which is greater than a factor by which the threshold value is increased in a normal state, and resets said factor, by which the threshold value is increased, to said normal value when said input signal is regarded as a non-voice signal.

15. A method for coding voice signals comprising the steps of:

receiving an input voice signal comprised of voice and non-voice signal components;

dividing the receiving input signal into predetermined frames of a given interval;

examining each frame to determine if it is a voice or non-voice signal; and respectively coding one of a voice signal and a non-voice signal for each frame responsive to identification of said frame as having a voice or non-voice signal;

said non-voice signal including a random signal which is employed as a sound source signal; and selecting a predicted sound source signal from probability code vectors stored in a probability code book, determining an energy in the predicted sound source signal selected and modifying the random signal by adjusting a gain of the random signal until an energy of the generated random signal is substantially equal to the energy of the predicted sound source signal.

16. A method for coding voice signals comprising the steps of:

receiving an input voice signal comprised of voice and non-voice signal components;

dividing the receiving input signal into predetermined frames of a given interval;

examining each frame to determine if it is a voice or non-voice signal;

respectively coding one ofa voice signal and a non-voice signal for each frame responsive to identification of said frame as having a voice or non-voice signal;

said non-voice signal including a random signal which is employed as a sound source signal; and selecting a predicted sound source signal from probability code vectors stored in a probability code book, determining an energy in the predicted sound source signal selected and modifying the random signal by adjusting a gain of the random signal until an energy of the generated random signal is substantially equal to the energy ofthe predicted sound source signal; and generating a linear predictive parameter representing a spectrum characteristic of the input signal;

modifying the coded non-voice signal by said parameter subtracting the modified coded non-voice signal from a sub-frame of the input signal to generate an error vector;

weighting the error vector according to audibility characteristics; and calculating a mean square ofthe error vector which is employed to select an optimum code stored in the probability code book.

17. A voice signal coding apparatus comprising:

a voice status detector for detecting whether an input signal comprised of voice and non-voice components and divided at predetermined frame intervals, is a voice signal or a non-voice signal;

a linear predictive analyzer outputting a linear predictive parameter associated with said input signal;

a linear predictive coder for generating a driving sound source signal corresponding to a residual linear predictive signal, said linear predictive coder including a voice sound source predicting part for coding a voice signal and a non-voice sound source predicting part for coding a non-voice signal;

a coding mode selector for selecting either a voice signal coding mode or a non-voice signal coding mode in which said linear predictive coder performs a coding operation, in accordance with a result given by said voice status detector;

said non-voice sound source predicting part including a random signal generator for generating a random signal representing a sound source signal;

a circuit for adjusting a gain of the random signal employing an output from the voice sound source predicting part;

a device employing the linear predictive parameter to modify the input signal;

a subtractor subtracting the modified input signal from the original input signal; and a circuit for evaluating the result of the subtracting circuit to modify a coded signal from one of said voice and non-voice sound signal predicting parts.

18. A voice signal coding apparatus comprising:

a voice status detector for detecting whether an input voice signal divided into predetermined frame intervals, is a voice signal or a non-voice signal during each frame interval, a detection that each frame interval is voiced or non-voiced being based on a frame energy of each frame interval;

a linear predictive analyzer for outputting a linear predictive parameter associated with said input signal;

a linear predictive coding circuit for generating a driving sound source signal corresponding to a residual linear predictive signal, said linear predictive coding circuit including a voice sound source predicting part for coding a voice signal and a non-voice sound source predicting part for coding a non-voice signal;

a coding mode selector for selecting either a voice signal coding mode or a non-voice signal coding mode in which said linear predictive coding circuit performs a coding operation, in accordance with a result given by said voice status detector.

said voice signal status detector comprising:

a first frame analyzer for determining an energy of an initial frame;

a threshold decision circuit for determining a threshold value based on an output of the first frame analyzer;

a second frame analyzer for detecting energy of at least one frame subsequent to the initial frame;

a third circuit for subtracting the initial frame energy from the output of said second frame analyzer; and a detector for comparing a difference value outputted by the the third circuit with the threshhold value generated by said threshold decision circuit to determine whether an examined frame is voice or non-voice, said determination being available for a frame immediately following the initial frame.

19. A method for coding voice signals comprising the steps of:

(a) receiving an input voice signal comprised of voice and non-voice signal components;

(b) dividing the receiving input signal into predetermined frames of a given interval;

(c) examining each frame to determine if it is a voice or non-voice signal;

(d) respectively coding one of a voice signal and a non-voice signal for each frame responsive to identification of said frame as having a voice or non-voice signal; said non-voice signal including a random signal which is employed as a sound source signal; and (e) selecting a predicted sound source signal from probability code vectors stored in a probability code book, determining an energy in the predicted sound source signal selected and modifying the random signal by adjusting a gain of the random signal until an energy of the generated random signal is substantially equal to the energy of the predicted sound source signal;

(f) step (c) further comprising measuring a level of an input signal of each frame;

(g) comparing the level of said input signal at step (f) with a threshold value provided as a criterion for determining whether said input signal is a voice signal or a non-voice signal and then outputting the comparison result; and (h) increasing said threshold value by a predetermined factor when the comparing step (g) determines that the level of said input signal is greater than a current threshold value, and decreasing said threshold value when said comparing step (g) determines that the level of said input signal is smaller than the current threshold value, wherein said predetermined factor by which said threshold value is changed is set in accordance with a difference between the current threshold value and a minimum level of the input signal during a predetermined period of past time.

20. A voice signal coding apparatus comprising:

a voice status detector for detecting whether an input signal divided at predetermined frame intervals is a voice signal or a non-voice signal;

a linear predictive analyzer outputting a linear predictive parameter associated with said input signal;

a linear predictive coder for generating a driving sound source signal corresponding to a residual linear predictive signal, said linear predictive coder including a voice sound source predicting part for coding a voice signal and a non-voice sound source predicting part for coding a non-voice signal;

a coding mode selector for selecting either a voice signal coding mode or a non-voice signal coding mode in which said linear predictive coder performs a coding operation, in accordance with a result given by said voice status detector;

said non-voice sound source predicting part including a random signal generator for generating a random signal representing a sound source signal;

a circuit for adjusting a gain of the random signal employing an output from the voice sound source predicting part;

a device employing the linear predictive parameter to modify the input signal;

a subtractor subtracting the modified input signal from the original input signal; and a circuit for evaluating the result of the subtracting circuit to modify a coded signal from one of said voice and non-voice sound signal predicting parts; and a voice signal status detector comprising:
  a level measuring circuit for measuring a level of an input signal divided at predetermined frame intervals;
  a comparator for comparing the level of said input signal measured by said level measuring circuit with a threshold value provided as a criterion for determining whether said input signal is a voice signal or a non-voice signal and then outputting the comparison result; and
  a threshold value adapting circuit by which said threshold value is increased by a predetermined factor when said comparator has determined that the level of said input signal is greater than a current threshold value, while said threshold value is decreased when said comparator has determined that the level of said input signal is smaller than the current threshold value, wherein said predetermined factor by which said threshold value is increased is set in accordance with a difference between the current threshold value and a minimum level of the input signal during a predetermined period of past time.

* * * * *